(12) United States Patent
Kia et al.

(10) Patent No.: US 10,358,767 B2
(45) Date of Patent: Jul. 23, 2019

(54) CARBON FIBER PRE-PREGS AND METHODS FOR MANUFACTURING THEREOF

(71) Applicant: GM Global Technology Operations LLC, Detroit, MI (US)

(72) Inventors: Hamid G. Kia, Bloomfield Hills, MI (US); Nicole D. Ellison, Farmington Hills, MI (US); Selina X. Zhao, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 203 days.

(21) Appl. No.: 15/211,814

(22) Filed: Jul. 15, 2016

(65) Prior Publication Data
US 2018/0016740 A1    Jan. 18, 2018

(51) Int. Cl.
*B32B 3/24* (2006.01)
*D06M 15/55* (2006.01)
(Continued)

(52) U.S. Cl.
CPC ............ *D06M 15/55* (2013.01); *B26D 1/225* (2013.01); *D06H 7/02* (2013.01); *B32B 3/266* (2013.01);
(Continued)

(58) Field of Classification Search
CPC ................... B32B 3/266; Y10T 428/24314
See application file for complete search history.

(56) References Cited

U.S. PATENT DOCUMENTS

| 3,458,615 A | 7/1969 | Bragaw, Jr. et al. |
| 3,699,210 A | 10/1972 | Binning et al. |
(Continued)

FOREIGN PATENT DOCUMENTS

| CN | 102965928 A | 3/2013 |
| CN | 104024494 A | 9/2014 |
(Continued)

OTHER PUBLICATIONS

Polyacrylonitrile (PAN) Carbon Fibers Industrial Capability Assessment, OUSD (AT&L) Industrial Policy, U.S. Department of Defense (Oct. 2005); 23 pages.
(Continued)

*Primary Examiner* — William P Watkins, III
(74) *Attorney, Agent, or Firm* — Harness, Dickey & Pierce, P.L.C.

(57) ABSTRACT

Methods and components produced from carbon fiber pre-impregnated composite precursor materials (pre-preg) having enhanced flowability and moldability are provided. Discontinuous cut regions are introduced into a pre-preg. A sheet of pre-preg may be contacted with a patterned surface having a plurality of non-contiguous staggered cutters, so that the contacting creates discontinuous cuts in the pre-preg. A plurality of staggered discontinuous cut regions are formed in the plurality of continuous carbon fibers that define a first plurality of carbon fibers having a first length and a second plurality of carbon fibers having a second distinct length. The patterned surface may be provided on a cutter device that is a roller or a plate having the non-contiguous staggered cutters formed or disposed thereon. The discontinuous cut regions that are formed in the pre-preg reduce stiffness and improve moldability/flowability when forming carbon fiber polymeric composites, while retaining high strength levels.

14 Claims, 10 Drawing Sheets

(51) Int. Cl.
  B26D 1/22 (2006.01)
  D06H 7/02 (2006.01)
  B32B 3/26 (2006.01)
  D06M 101/40 (2006.01)

(52) U.S. Cl.
  CPC ..... *D06M 2101/40* (2013.01); *D10B 2101/12* (2013.01); *D10B 2505/02* (2013.01); *Y10T 428/24314* (2015.01)

(56) References Cited

U.S. PATENT DOCUMENTS

| | | | |
|---|---|---|---|
| 4,208,267 A | 6/1980 | Diefendorf et al. | |
| 5,017,423 A | 5/1991 | Bossmann et al. | |
| 5,024,818 A | 6/1991 | Tibbetts et al. | |
| 5,582,912 A | 12/1996 | McCullough, Jr. et al. | |
| 5,916,346 A * | 6/1999 | Neal | B26D 7/20 83/347 |
| 6,638,883 B2 | 10/2003 | Gaffney et al. | |
| 8,191,215 B2 | 6/2012 | Meyer | |
| 8,309,644 B1 | 11/2012 | Huang | |
| 8,567,469 B2 | 10/2013 | Meyer et al. | |
| 8,568,549 B2 | 10/2013 | Meyer et al. | |
| 9,896,783 B2 | 2/2018 | Kia | |
| 9,920,454 B2 | 3/2018 | Sutti et al. | |
| 10,113,250 B2 | 10/2018 | Kia | |
| 2003/0100239 A1 | 5/2003 | Gaffney et al. | |
| 2004/0089129 A1* | 5/2004 | Toth | B26D 7/2614 83/880 |
| 2010/0028593 A1* | 2/2010 | Taketa | B29C 43/222 428/113 |
| 2012/0213997 A1 | 8/2012 | Wang et al. | |
| 2014/0264985 A1 | 9/2014 | Sutti et al. | |
| 2016/0194468 A1* | 7/2016 | Ogasawara | C08J 5/042 524/495 |
| 2017/0067185 A1 | 3/2017 | Kia | |
| 2017/0067186 A1 | 3/2017 | Kia | |
| 2017/0314668 A1 | 11/2017 | Kia et al. | |
| 2018/0016740 A1 | 1/2018 | Kia et al. | |
| 2018/0085991 A1 | 3/2018 | Kia et al. | |

FOREIGN PATENT DOCUMENTS

| | | |
|---|---|---|
| CN | 106521716 A | 3/2017 |
| CN | 106521718 A | 3/2017 |
| CN | 107618194 A | 1/2018 |
| CN | 107866985 A | 4/2018 |
| DE | 3540411 A1 | 5/1987 |
| DE | 19944164 A1 | 6/2000 |
| DE | 102007012607 A1 | 9/2008 |
| DE | 102007012609 A1 | 9/2008 |
| DE | 102007012608 A1 | 10/2008 |
| DE | 102016116053 A1 | 3/2017 |
| DE | 102016116662 A1 | 3/2017 |
| DE | 102017115451 A1 | 1/2018 |
| DE | 102017121837 A1 | 3/2018 |
| EP | 2127840 A1 | 12/2009 |
| EP | 2679619 A1 | 1/2014 |
| EP | 2862971 A1 | 4/2015 |
| GB | 2373793 A | 10/2002 |
| JP | 2001-73230 A | 3/2001 |
| JP | 2013082229 A | 5/2013 |
| WO | WO-2014100127 A1 | 6/2014 |

OTHER PUBLICATIONS

Technical Data Sheet, "Polyacrylonitrile (PAN): how is it made?", Toray Carbon Fibers Europe, downloaded from http://www.toray-cfe.com/index.php/en/newsletter-v2/42-product/48-polyacrylonitrile-pan-how-is-it made, (published on or before Aug. 14, 2015); 2 pages.

Park, Soon-Jin, et al., "Precursors and Manufacturing of Carbon Fibers," Springer Series in Materials Science, vol. 210 (Oct. 9, 2014); pp. 31-66.

Cytec Industries Inc.; Safety Data Sheet for VTM® 264 Prepreg; Aug. 5, 2013; 9 pages.

Cytec Industrial Materials; VTM® 264-1 & VTM® 264S-1; PDS1268_07.13_Issue1a; Jul. 17, 2013; 3 pages.

First Office Action for German Application No. 102016116662.6 dated Aug. 30, 2017; 6 pages.

First Office Action for German Application No. 102016116053.09 dated Aug. 29, 2017; 5 pages.

First Office Action for corresponding German Application No. 102017115451.5 dated May 18, 2018 and correspondence dated May 2018, 2018 from Manitz, Finsterwald & Partner summarizing contents; 5 pages.

Hamid G. Kia et al.; U.S. Appl. No. 15/836,315, filed Dec. 8, 2017 entitled "Equipment for Perforated Pre-Impregnated Reinforcement Materials"; 54 pages.

Hamid G. Kia et al.; U.S. Appl. No. 15/211,814, filed Jul. 15, 2016 entitled "Carbon Fiber Pre-Pregs and Methods for Manufacturing Thereof"; 44 pages.

Hamid G. Kia et al.; U.S. Appl. No. 15/685,157, filed Aug. 24, 2017 entitled "Modification of Continuous Carbon Fibers During Precursor Formation for Composites Having Enhanced Moldability"; 40 pages.

Hamid G. Kia et al.; U.S. Appl. No. 15/141,361, filed Apr. 28, 2016 entitled "Linear Expansion Reduction of Metal Component Assemblies Using Composites"; 41 pages.

First Office Action for German Patent Application No. 102017121837.8 dated Oct. 4, 2018 and correspondence dated Oct. 17, 2018 from Manitz, Finsterwald & Partner summarizing contents; 6 pages.

("Hollow." Merriam Webster, www.merriam-webster.com/dictionary/hollow (2018).

First Office Action for Chinese Patent Application No. 201610771305.1 dated Jun. 12, 2018 with English language machine translation, 9 pages.

First Office Action for Chinese Patent Application No. 201610743811.X dated Jun. 21, 2018 with English language machine translation, 9 pages.

\* cited by examiner

CARBON FIBER PRE-PREGS AND METHODS FOR MANUFACTURING THEREOF

FIELD

The present disclosure relates to methods of treating continuous carbon fibers for use in high strength polymeric composite material pre-pregs having improved moldability and diminished warpage in a molded part.

BACKGROUND

This section provides background information related to the present disclosure which is not necessarily prior art.

Carbon fibers are used as a light-weight reinforcement phase to make high-strength light-weight polymeric composite materials. The carbon fibers may be continuous filaments that may be thousands of micrometers ($\mu m$) or millimeters (mm) in length. A group of continuous carbon fibers are often categorized as a bundle of continuous carbon fiber filaments. Carbon fiber "tow" is usually designated as a number of filaments in thousands (designated by K after the respective tow number). Alternatively, carbon fiber bundles may be chopped or milled and thus form short segments of carbon fibers (filaments or bundles) typically having a mean fiber length between 50 $\mu m$ (about 0.002 inches) and 50 mm (about 1.97 inches). While composites incorporating carbon fibers are all light-weight and high-strength, composites incorporating continuous carbon fiber filaments have especially high strength as compared to composites incorporating chopped or milled carbon fibers. By way of non-limiting example, a representative unidirectional continuous carbon fiber filament when incorporated into a composite has an ultrahigh ultimate tensile strength of about 1,500 to 2,000 MPa, while chopped carbon fibers have an ultimate tensile strength of about 200 MPa to 350 MPa.

Composite articles or components can be formed by using sheets or strips of a reinforcement material, such as a carbon fiber-based material having continuous carbon fibers. Polymer precursors, such as resins, can be impregnated in carbon fiber-based substrate material systems, known as pre-impregnating (referred to as "pre-preg") that involves wetting a resin into the carbon fiber-based substrate material in a first step, then optionally winding up the carbon fiber-based substrate material, and storing it for later use.

While the ultrahigh strengths associated with carbon-fiber composites are highly desirable in certain applications, one challenge in using continuous carbon fibers composite pre-pregs is the lack of flowability and formability, because composite pre-pregs incorporating continuous carbon fibers can be too stiff having high resistance to flow. Such inflexibility and rigidity can translate to poor moldability, making it difficult to form three-dimensional shapes from composites having continuous carbon fibers. Further, lack of flowability in the pre-preg material can result in warpage in the final composite product and issues with undesirable surface appearance. It would be desirable to form continuous carbon fiber pre-preg materials having higher flowability, and thus greater moldability, with the capability of readily forming complex and three-dimensionally shaped components with ultrahigh-strengths.

SUMMARY

This section provides a general summary of the disclosure, and is not a comprehensive disclosure of its full scope or all of its features.

In various aspects, the present disclosure provides a method of producing a carbon fiber pre-impregnated composite precursor material having enhanced moldability. The method comprises contacting a sheet of a carbon fiber pre-impregnated composite precursor material comprising a plurality of continuous carbon fibers and a polymer material precursor with a patterned surface having a plurality of non-contiguous staggered cutters. The contacting creates discontinuous cuts in the carbon fiber pre-impregnated composite precursor material. In certain aspects, the contacting cuts the carbon fiber pre-impregnated composite precursor material to form a plurality of staggered discontinuous cut regions in the plurality of continuous carbon fibers. The plurality of continuous fibers thus comprises a first plurality of carbon fibers having a first length and a second plurality of carbon fibers having a second distinct length.

In other aspects, the present disclosure provides a carbon fiber pre-impregnated composite precursor material having enhanced moldability. The precursor material comprises a sheet comprising a plurality of continuous carbon fibers and a polymer material precursor. The plurality of continuous carbon fibers has a plurality of staggered discontinuous cut regions that define a first plurality of carbon fibers having a first length and a second plurality of carbon fibers having a second distinct length.

In yet other aspects, the present disclosure provides a cutter device for producing a carbon fiber pre-impregnated composite precursor material having enhanced moldability. The cutter device may have a patterned surface having a plurality of non-contiguous staggered cutters. The plurality of non-contiguous staggered cutters comprises a first cutter, a second cutter, a third cutter, and a fourth cutter. The first cutter and the second cutter are spaced apart from one another, but aligned on a first row widthwise and the third cutter and the fourth cutter are spaced apart from one another, but aligned on a second row widthwise. The first cutter is offset from the third cutter lengthwise and the second cutter is offset from the fourth cutter lengthwise.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Carbon-fiber reinforced polymeric composites (CFRP) comprise a resin that is cured and/or solidified to form a polymeric matrix having a plurality of carbon fibers distributed therein as a reinforcement phase. As discussed above, CFRPs are often created from a pre-preg, where bundles of the carbon fibers are used in sheets that are impregnated with uncured or partially cured resin. A component or part can be formed by using the pre-preg to be laid-up on a mandrel or disposed in a mold, where it is then consolidated and cured/reacted to form the final component.

As noted above, polymeric composites incorporating bundles of continuous carbon fibers are high-strength and light-weight; however, they are typically difficult to make into complex three-dimensional shaped components. In various aspects, the present disclosure pertains to treatment of a carbon fiber pre-impregnated composite precursor material that include bundles of continuous carbon fibers, which in certain aspects have a length of greater than or equal to about 2 inches prior to treatment, as compared to pre-pregs having chopped or milled carbon fibers. In certain aspects, a continuous carbon fiber has a length of greater than or equal to about 2 inches, optionally greater than or equal to about 3 inches, greater than or equal to about 4 inches, optionally greater than or equal to about 5 inches, optionally greater than or equal to about 6 inches, optionally greater than or equal to about 7 inches, optionally greater than or equal to about 8 inches, optionally greater than or equal to about 9 inches, optionally greater than or equal to about 10 inches, optionally greater than or equal to about 11 inches, and in certain variations, optionally greater than or equal to about 12 inches (or 1 foot). Continuous carbon fiber polymeric composites have very high strengths and high stiffness (with high elastic modulus levels). However, without further manipulation, such continuous carbon fiber polymeric composites are not readily made into contoured or complex three-dimensionally shaped parts and suffer from warpage and surface appearance issues.

Two techniques are currently used to form complex shaped parts from continuous carbon fiber composites, but both suffer from certain drawbacks. The first technique incorporates continuous carbon fibers into a composite sheet having continuous unidirectional carbon fibers, but then divides the larger composite sheet into multiple smaller pieces (either as a pre-preg or just before application to form the component). The smaller cut pieces are then assembled so that the edges of adjacent pieces overlap in a manual layup process to create a larger structure. The smaller pieces thus have hundreds of thousands of continuous carbon fiber filaments (e.g., cut bundles) that terminate on the same cut line(s). While the smaller pieces can be laid up to create more complex shapes and contours, this technique has the disadvantage of reducing strength of the part because the unidirectional carbon fiber filaments all end along the same cut line. Even though the cut pieces overlap, there remain various loci or regions for stress propagation and fracture throughout the composite along the cut lines that reduces overall strength.

Alternatively, in another technique, the carbon fiber bundles may be chopped or milled into shorter fiber segments, typically with a maximum length of less than about 2 inches, prior to be incorporated into a pre-preg material. Each bundle may have approximately 50,000 filaments (e.g., 50K tow), by way of example. When carbon fibers are chopped, a tow of continuous carbon fibers is cut across an entire width of the tow, so that a continuous clean cut occurs at predetermined distances. Typically the chopped fibers are distributed in a random orientation homogenously within the pre-preg or composite as an isotropic reinforcement phase. However, the short chopped fibers are discontinuous and provide open regions between distinct fibers for stress and crack propagation through the resin/polymeric matrix. While still providing high strengths, chopped carbon fiber composites typically have lower strengths than continuous carbon fiber composites, often an order of magnitude less.

In certain aspects, the present technology provides methods for improving moldability and flowability, while reducing warpage, in components formed from carbon fiber pre-impregnated composite precursor materials that include bundles of continuous carbon fibers as a reinforcement phase and a polymer material precursor. In certain aspects, the method involves introducing discontinuous cuts in the carbon fiber pre-impregnated composite precursor material, which helps to improve improved moldability and reduce stiffness and warpage, as compared to conventional continuous fiber pre-pregs.

Figure 1:
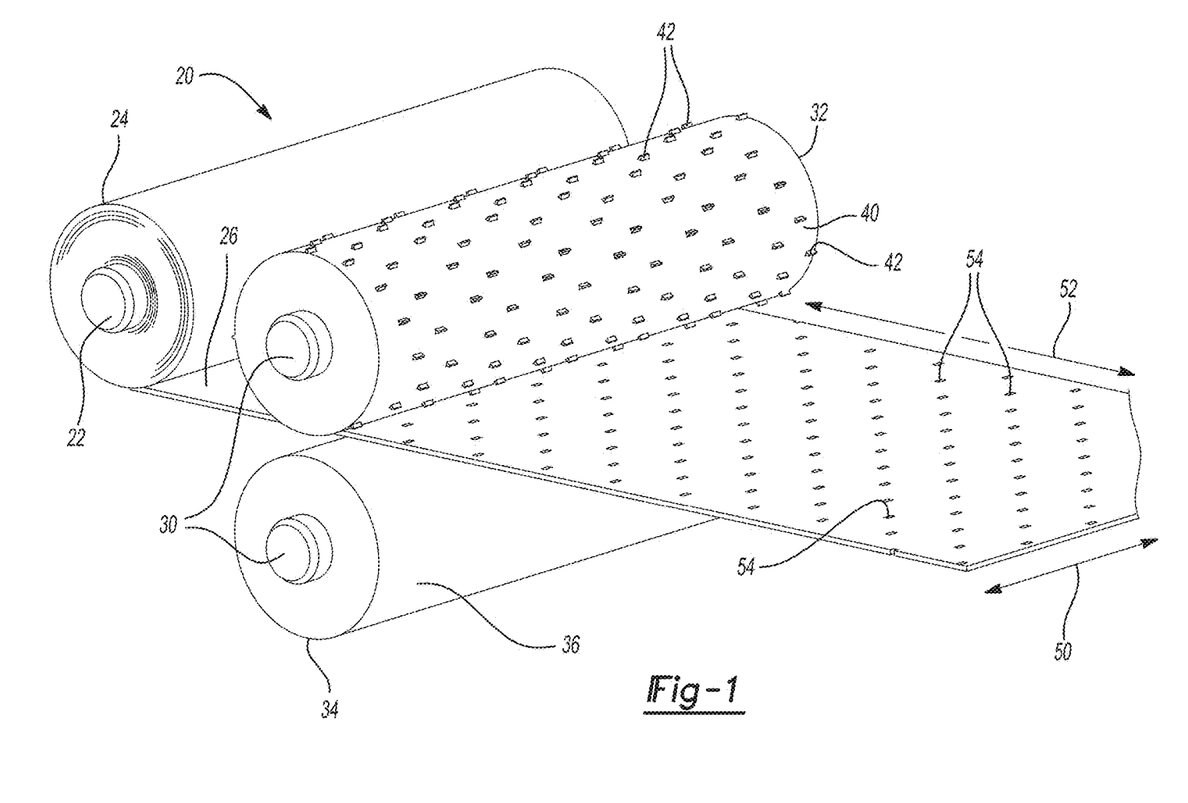
FIG. 1 is schematic of a system for processing a continuous carbon fiber pre-impregnated composite precursor material with a pair of roller devices, where one roller has a patterned surface having a plurality of non-contiguous staggered cutters that create a plurality of discontinuous cuts in the continuous carbon fiber pre-impregnated composite precursor material in accordance with certain aspects of the present disclosure.

In certain aspects, the present disclosure contemplates a method of producing a carbon fiber pre-impregnated composite precursor material having enhanced moldability in a processing system 20 like that shown in FIG. 1. A roll 22 of continuous carbon fiber pre-impregnated composite precursor material 24 can be unspooled so that a sheet 26 of the carbon fiber pre-impregnated composite precursor material 24 is passed between a cutter device in the form of a pair of rollers 30. The sheet 26 of carbon fiber pre-impregnated composite precursor material 24 includes both spread-apart continuous carbon fibers (e.g., tow) and a polymer material precursor. The pair of rollers 30 includes a first roller 32 and a second counter-roller 34. The first roller 32 has a patterned surface 40 that includes a plurality of non-contiguous staggered cutters 42. As will be discussed in further detail below, the cutters 42 on the patterned surface 40 are discontinuous and non-contacting, and thus spaced apart from one another both in a widthwise dimension or direction (shown by width 50) and lengthwise dimension or direction (shown by length 52). This patterned surface 40 contrasts with conventional cutters for forming chopped carbon fiber filaments, where a single continuous cutting blade extends across the entire width (e.g., 50) of the roller. The second counter-roller 34 may have a second surface 36 may be flat and made of an elastomeric or flexible material. The method includes contacting the sheet 26 of carbon fiber pre-impregnated composite precursor material 24 with the patterned surface 40 having the plurality of non-contiguous staggered cutters 42, so that the contacting with the pair of rollers 30 creates discontinuous cuts 54 in the carbon fiber pre-impregnated composite precursor material 24. The flat surface profile of the second counter-roller 34 facilitates the cutters 42 creating the cut regions within the carbon fiber pre-impregnated composite precursor material 24.

Figure 2:
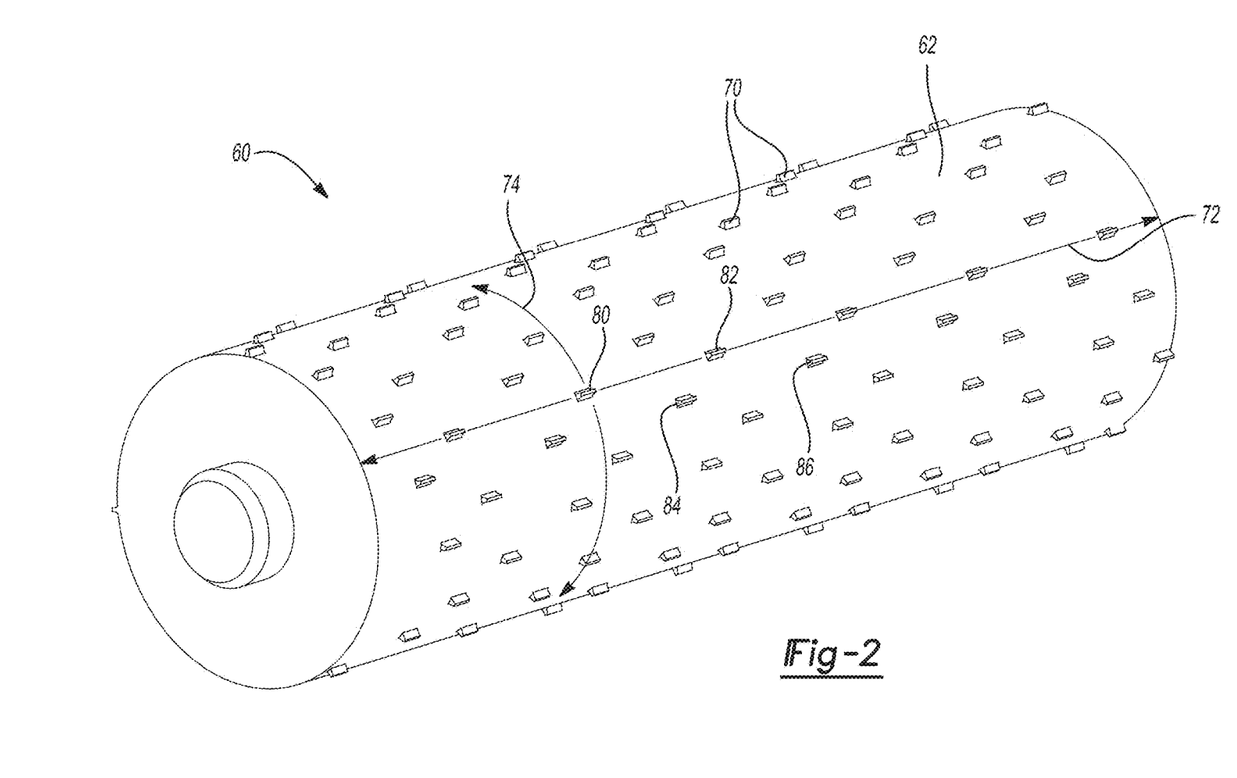
FIG. 2 shows a cutting device in the form of a cutting roller having machined non-contiguous staggered cutters for producing a carbon fiber pre-impregnated composite precursor material with enhanced moldability in accordance with certain aspects of the present disclosure.

FIG. 2 shows a cutting roller 60, like first roller 32 in FIG. 1, for producing a carbon fiber pre-impregnated composite precursor material having enhanced moldability in accordance with certain aspects of the present disclosure. The cutting roller 60 has a surface 62. A plurality of individual non-contiguous staggered cutters 70 is machined into the surface 62. Each individual cutter 70 may have a width of greater than or equal to about 0.2 mm to less than or equal to about 2 mm. Each cutter 70 may have height (measured from the surface 62 as a baseline) of greater than or equal to about 0.1 mm to less than or equal to about 3 mm, optionally of greater than or equal to about 0.1 mm to less than or equal to about 1 mm. In certain variations, each cutter 70 may have a width of about 1 mm and a height of about 0.5 mm. It should be noted that while each cutter of the plurality 70 may have the same width and dimensions, in alternative variations, the cutter dimensions can vary from one another.

The cutting roller 60 defines both a widthwise dimension 72 and a circumferential dimension 74 (e.g., corresponding to a length around the roller 60). As will be described in further detail below, a predetermined pattern includes cutters 70 that are staggered and non-continuous and spaced apart from one another. For example, the plurality of non-contiguous staggered cutters 70 includes a first cutter 80, a second cutter 82, a third cutter 84, and a fourth cutter 86. The first cutter 80 and the second cutter 82 are spaced apart from one another, but aligned on a first row in the widthwise direction 72. Likewise, the third cutter 84 and the fourth cutter 86 are spaced apart from one another, but aligned on a second row distinct from the first row in the widthwise direction 72. The second row is offset from the first row. Thus, the first cutter 80 is offset in the circumferential direction 74 from the third cutter 84 and the second cutter 82 is offset in the circumferential direction 74 from the third cutter 84 and the fourth cutter 86. In this manner, the cutters 70 are staggered and offset from one another in at least one direction (e.g., the circumferential direction 74). As will be described further below, such a plurality of non-contiguous staggered cutters 70 is thus capable of forming discontinuous cuts in carbon fiber pre-impregnated composite precursor materials.

Figure 3:
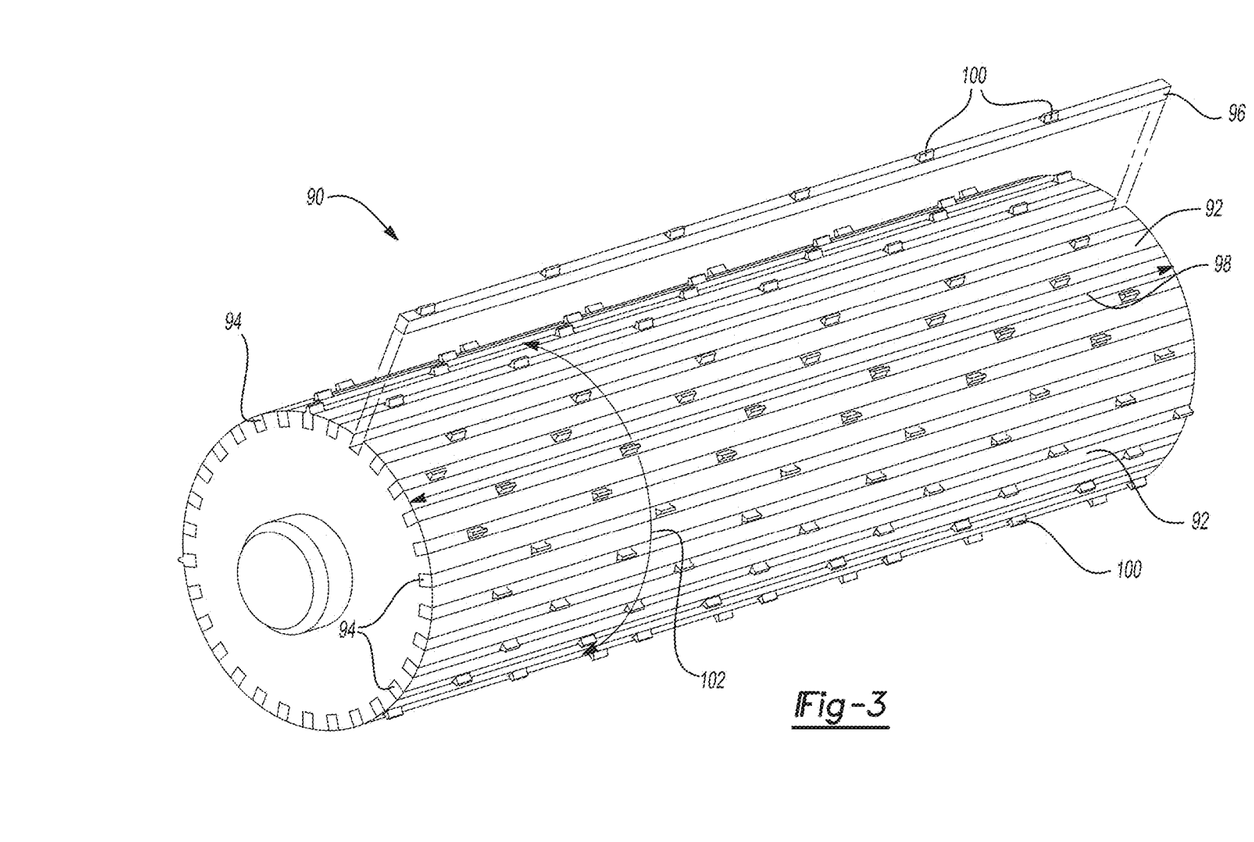
FIG. 3 shows an alternative variation of a cutting device in the form of a cutting roller having removable non-contiguous staggered cutters for producing a carbon fiber pre-impregnated composite precursor material with enhanced moldability in accordance with certain aspects of the present disclosure.

FIG. 3 shows an alternative embodiment of a cutting roller 90 for producing a carbon fiber pre-impregnated composite precursor material having enhanced moldability in accordance with certain aspects of the present disclosure. The cutting roller 90 has a surface 92. A plurality of slots or grooves 94 is formed (e.g., via machining) into the surface 92 at regular intervals. A bar component 96 is dimensioned to fit within an individual groove 94 and extends across a width 98 of the cutting roller 90. The bar component 96 includes a plurality of individual non-contiguous spaced apart cutters 100. Each individual cutter 100 may have the dimensions described above in the context of FIG. 2. In one non-limiting example, the cutting roller 90 may have a circumference 102 of about 31 cm and may have 60 grooves 94 formed around the circumference 102. Here, 60 bar components 96 may be seated within each of the 60 grooves 94. Bar components 96 may be secured, for example, by an adhesive or fastener in the grooves 94. The bar components 96 may be removed and thus replaceable, for example, when the cutting surfaces of the cutters 100 become dull. As will be appreciated by those of skill in the art, other roller diameters and spacing will change the number of grooves 94 and bar components 96 used. Also, in alternative variations, select grooves 94 may be left empty and not filled with any bar component 96 to provide a breadth of pattern design options. Notably, each respective bar component 96 has cutters 100 that are staggered from one another along the circumferential direction 102 in a similar manner to the design in FIG. 2. Thus, there may be at least two distinct bar components 96 with cutters in distinct spaced apart positions that are seated adjacent to one another to create the desired non-contiguous staggered cutter pattern on the surface 92 of cutting roller 90. It should be noted that while not shown, the plurality of non-contiguous staggered cutters may seats in individual slots, recesses, or grooves formed individually on a surface (rather than on an elongated bar component) and like the bar component embodiment may be removable and replaced when the cutter edge dulls.

Figure 4:
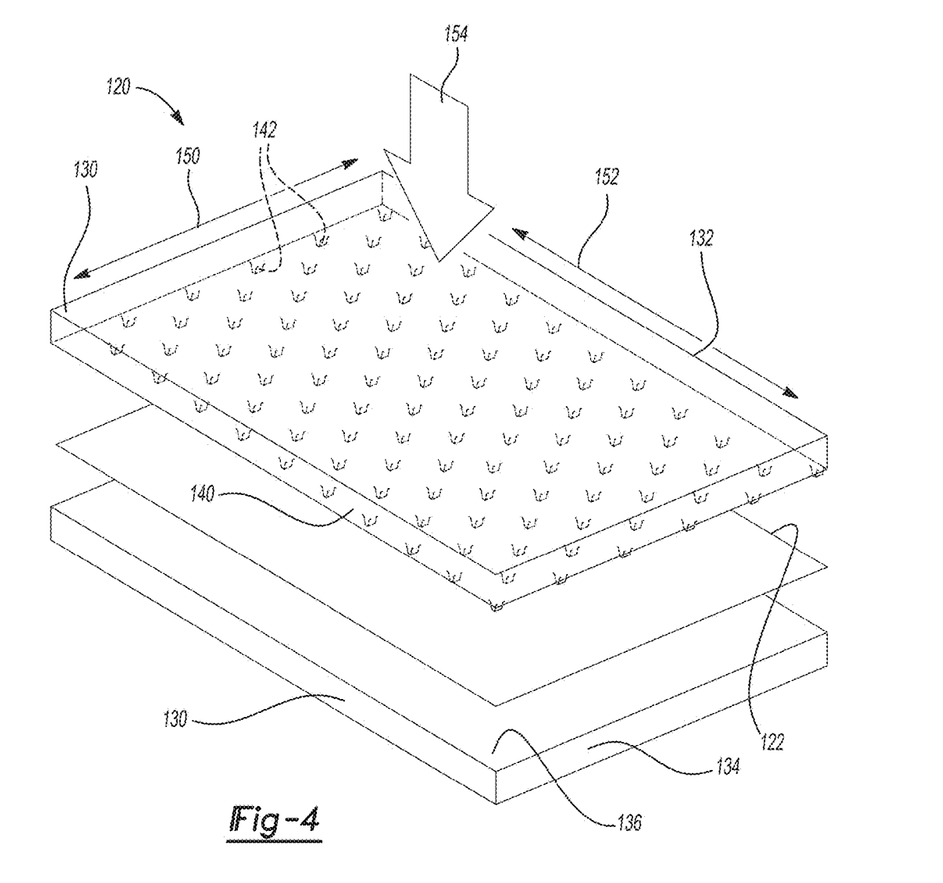
FIG. 4 is schematic of a system for processing a continuous carbon fiber pre-impregnated composite precursor material with a pair of plate devices, where one plate has a patterned surface having a plurality of non-contiguous staggered cutters that create a plurality of discontinuous cuts in the continuous carbon fiber pre-impregnated composite precursor material in accordance with certain aspects of the present disclosure.
Figure 5:
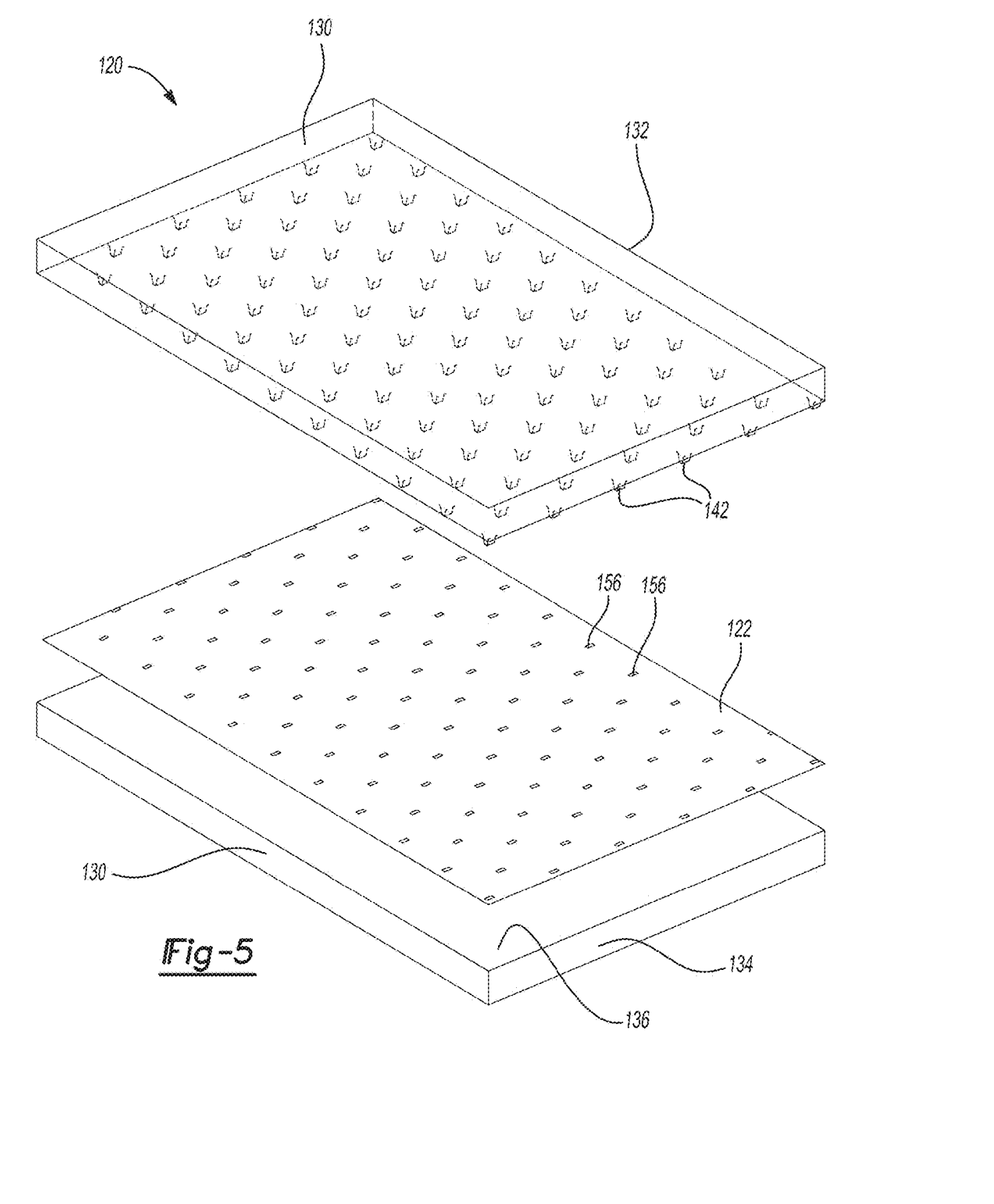
FIG. 5 shows the system of FIG. 4, after the plate devices have been mated and separated, where a plurality of discontinuous cuts have been formed in the continuous carbon fiber pre-impregnated composite precursor material in accordance with certain aspects of the present disclosure.

In another alternative variation, the present disclosure contemplates a method of producing a carbon fiber pre-impregnated composite precursor material having enhanced moldability in a processing system 120 like that shown in FIGS. 4 and 5. A cut piece or sheet 122 of continuous carbon fiber pre-impregnated composite precursor material can be unspooled and possibly cut. The sheet 122 is disposed between a cutter device in the form of a pair of plates 130. The sheet 122 of carbon fiber pre-impregnated composite precursor material includes both spread-apart continuous carbon fibers and a polymer material precursor. The pair of plates 130 includes a first plate 132 and a second counter-plate 134. The first plate 132 has a patterned surface 140 that includes a plurality of non-contiguous staggered cutters 142. The cutters 142 may be machined into the surface 140. As will be discussed in further detail below, the cutters 142 on the patterned surface 140 are discontinuous and non-contacting, and thus spaced apart from one another both in a widthwise direction or dimension (shown by width 150) and lengthwise direction (shown by length 152).

The second counter-plate 134 may have a second surface 136 that is flat. The method includes contacting the sheet 122 of carbon fiber pre-impregnated composite precursor material with the patterned surface 140 having the plurality of non-contiguous staggered cutters 142. The contacting may include applying pressure 154 as shown in FIG. 4 so that the plates are forced into close proximity with one another. FIG. 5 shows the pre-preg sheet 122 after the pair of plates 130 are separated from one another, showing that contacting the pre-preg sheet 122 with the pair of plates 130 creates discontinuous cut regions 156 in the carbon fiber pre-impregnated composite precursor material. The flat surface profile of the second counter-plate 134 facilitates the cutters 142 creating the cut regions 156 within the sheet 122 of carbon fiber pre-impregnated composite precursor material. While not shown, in an alternative variation, the plate may have removable and replaceable cutters, for example, cutters disposed on bar components that slide into surface slots or grooves like in the roller device of FIG. 3.

Thus, the present disclosure provides methods for producing a carbon fiber pre-impregnated composite precursor material having enhanced moldability. The method can include contacting a sheet of a carbon fiber pre-impregnated composite precursor material with a patterned surface having a plurality of non-contiguous staggered cutters. The contacting thus creates discontinuous cuts in the carbon fiber pre-impregnated composite precursor material. More specifically, in preferred aspects, the contacting cuts the carbon fiber pre-impregnated composite precursor material to form a plurality of staggered discontinuous cut regions in the plurality of continuous carbon fibers that define a first plurality of carbon fibers having a first length and a second plurality of carbon fibers having a second distinct length. In this manner, carbon fibers in the pre-impregnated composite precursor material have two or more distinct lengths that enable enhanced moldability.

Figure 6:
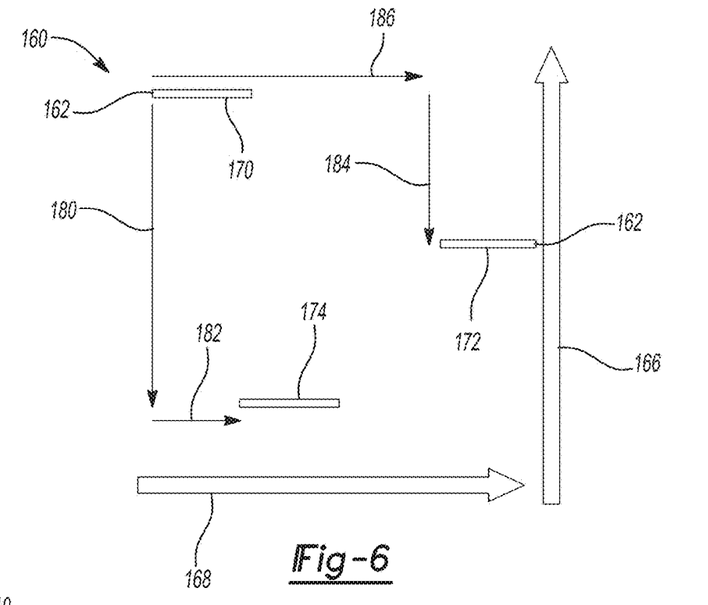
FIG. 6 shows an example of a surface pattern of a plurality of non-contiguous staggered cutters for a cutter device in accordance with certain aspects of the present disclosure.

FIG. 6 shows an example of a surface pattern 160 of a plurality of non-contiguous staggered cutters 162. A carbon fiber axial direction 166 and a carbon fiber cross direction 168 are shown. The plurality of non-contiguous staggered cutters 162 includes a first cutter 170, a second cutter 172, and a third cutter 174. The surface pattern 160 includes an axial travel down ($A_d$) dimension 180 showing the distance along the axial direction 166 between the first cutter 170 and the third cutter 174. The surface pattern 160 also includes an axial travel right ($A_r$) dimension 182 showing the offset distance along the cross-direction 168 between a first terminal end of the first cutter 170 and a first terminal end of the third cutter 174. A cross travel down ($C_d$) dimension 184 is the distance along the axial direction 166 between the first cutter 170 and the offset second cutter 172. A cross travel right ($C_r$) dimension 186 shows the offset distance along the cross-direction 168 between a first terminal end of the first cutter 170 and a first terminal end of the second cutter 172. In such a pattern, two distinct fiber lengths are formed. A minimum cut fiber length ($L_{min}$) equals $A_d$. A maximum cut fiber length ($L_{max}$) can be calculated by the following equation:

$$L_{max} = A_d \times \left(\frac{C_r}{A_r} - A_r - 1\right).$$

Having a fiber length that is shorter than a typical continuous fiber can serve to enhance moldability and flowability in the carbon-fiber pre-impregnated composite precursor material; however, the presence of such short fibers can serve to reduce strength in the composite ultimately formed. Longer fibers can increase strength, but can also increase stiffness and reduce moldability/formability. Thus, the carbon fiber pre-impregnated composite precursor material that is formed in accordance with certain aspects of the present teachings includes a plurality of staggered discontinuous cut regions where a first plurality of carbon fibers has a first length corresponding to the minimum cut fiber length ($L_{min}$) and a second plurality of carbon fibers having a second distinct length corresponding to the maximum cut fiber length ($L_{max}$). The minimum cut fiber length ($L_{min}$) and the maximum cut fiber length ($L_{max}$) are optimized to provide the necessary moldability and flowability (to avoid warpage when compression molded or later formed), but to also maintain strength levels of the composite formed.

In certain aspects, the first length is greater than or equal to about 5 mm to less than or equal to about 15 mm and the second distinct length is greater than or equal to about 20 mm to less than or equal to about 90 mm. In other aspects, the first length is greater than or equal to about 5 mm to less than or equal to about 10 mm and the second distinct length is greater than or equal to about 40 mm to less than or equal to about 85 mm. In one preferred variation, the first length is about 10 mm and the second distinct length is about 85 mm.

It should be noted that after the contacting, the plurality of continuous carbon fibers may comprise greater than or equal to about 40% to less than or equal to about 60% of the first plurality of carbon fibers with the first length and greater than or equal to about 40% to less than or equal to about 60% of the second plurality of carbon fibers with the second length. In the surface patterns discussed herein, the plurality of staggered discontinuous cut regions in the plurality of continuous carbon fibers may form carbon fibers with about 50% of the first plurality of carbon fibers with the first length and about 50% of the second plurality of carbon fibers with the second length. In certain aspects, the carbon fiber pre-impregnated composite precursor material may have more than two fiber lengths. Indeed, edge effects may occur with the patterns discussed herein, where 5-10% of carbon fibers do not conform to either the first length or the second length, but rather have distinct lengths. Furthermore, it should be noted that the surface patterns may be varied to form more than two lengths of fibers or different fiber length amounts/distributions within the pre-preg material.

Figure 7:
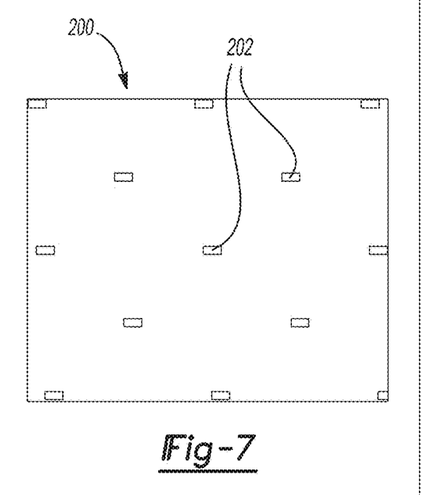
FIG. 7 shows an example of an embodiment of a surface pattern having a plurality of non-contiguous staggered cutters for a cutter device in accordance with certain aspects of the present disclosure.
Figure 8:
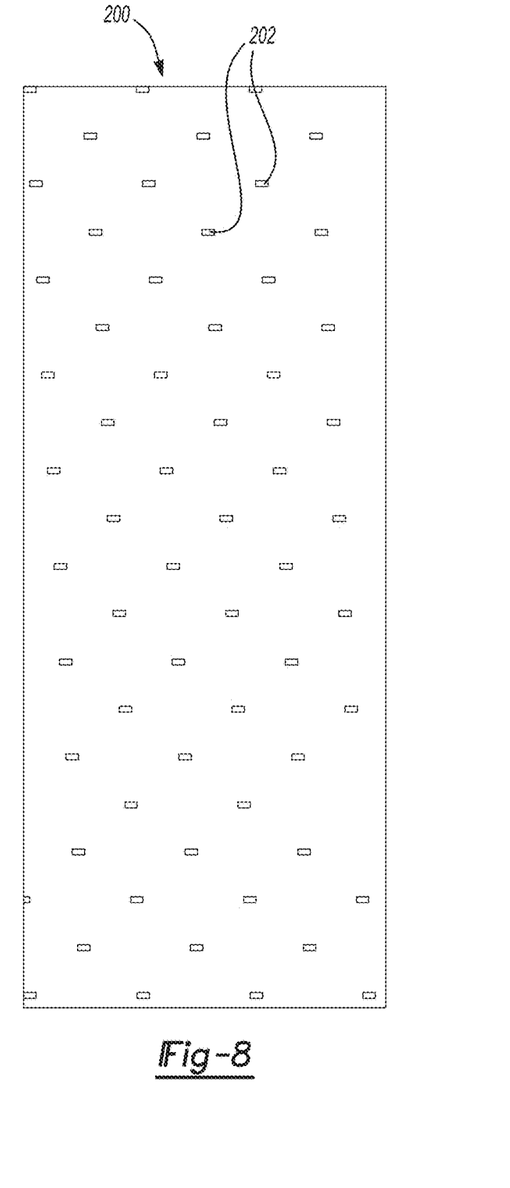
FIG. 8 shows another example of an embodiment of a surface pattern having a plurality of non-contiguous staggered cutters for a cutter device in accordance with certain aspects of the present disclosure.
Figure 9:
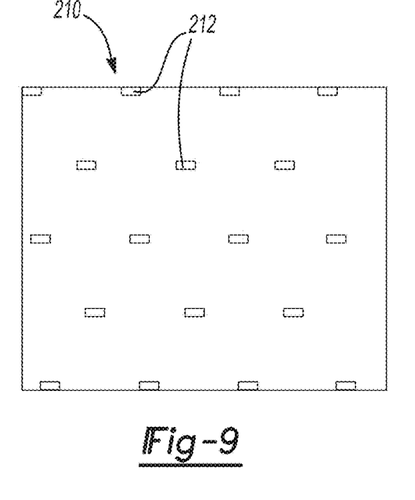
FIG. 9 shows yet another example of an embodiment of a surface pattern having a plurality of non-contiguous staggered cutters for a cutter device in accordance with certain aspects of the present disclosure.
Figure 10:
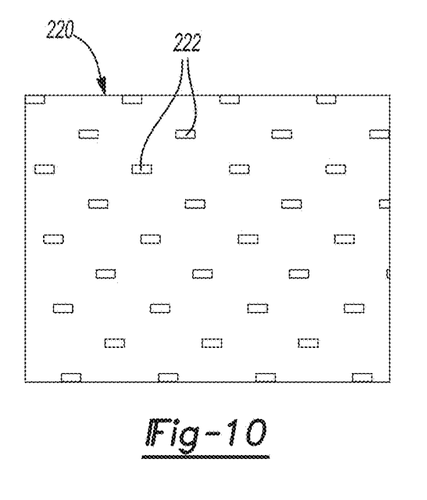
FIG. 10 shows an example of another embodiment of a surface pattern having a plurality of non-contiguous staggered cutters for a cutter device in accordance with certain aspects of the present disclosure.
Figure 11:
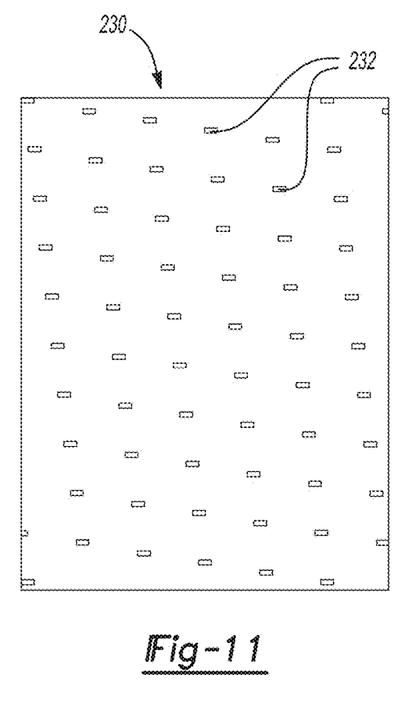
FIG. 11 shows another example of an embodiment of a surface pattern having a plurality of non-contiguous staggered cutters for a cutter device in accordance with certain aspects of the present disclosure.
Figure 12:
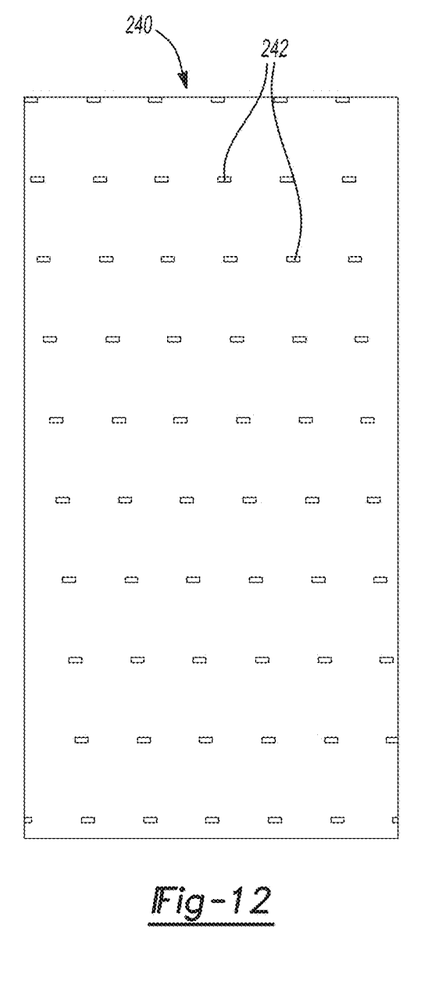
FIG. 12 shows an example of yet another embodiment of a surface pattern having a plurality of non-contiguous staggered cutters for a cutter device in accordance with certain aspects of the present disclosure.

Example surface patterns of non-contiguous staggered cutters are shown in FIGS. 7-12. FIGS. 7 and 8 show a first surface pattern designated 200 and having non-contiguous staggered cutters 202. FIG. 7 shows a 20 mm by 20 mm area, while FIG. 8 shows a 30 mm by 96 mm area of the same first surface pattern 200. FIG. 9 shows a second surface pattern designated 210 and having non-contiguous staggered cutters 212. FIG. 10 shows a third surface pattern designated 220 and having non-contiguous staggered cutters 222. FIG. 11 shows a fourth surface pattern designated 230 and having non-contiguous staggered cutters 232. Lastly, FIG. 12 shows a fifth surface pattern designated 240 and having non-contiguous staggered cutters 242.

Table 1 shows the $A_d$, $A_r$, $C_r$, and $C_d$ dimensions as described in the context of FIG. 6, as well as the maximum fiber length and minimum fiber lengths formed by each such pattern shown in FIGS. 7-12.

TABLE 1

| Figure No./Pattern No. | $A_d$ | $A_r$ | $C_r$ | $C_d$ | Max. Fiber Length ($L_{max}$) | Min. Fiber Length ($L_{min}$) |
|---|---|---|---|---|---|---|
| FIGS. 7-8/1 | 10 | 0.5 | 5 | 5 | 85 | 10 |
| FIG. 9/2 | 10 | 0.5 | 3 | 5 | 45 | 10 |
| FIG. 10/3 | 5 | 0.5 | 3 | 2.5 | 22.5 | 5 |
| FIG. 11/4 | 5 | 0.5 | 5 | 1 | 42.5 | 5 |
| FIG. 12/5 | 10 | 0.5 | 5 | 0 | 85 | 10 |

Thus, in certain aspects, the present disclosure contemplates a patterned surface with plurality of non-contiguous staggered cutters where $A_d$ may be greater than or equal to about 5 to less than or equal to about 10. $A_r$ may be 0.5. $C_r$ may be greater than or equal to about 3 to less than or equal to about 5. $C_d$ may be greater than 0 to less than or equal to about 5. In certain non-limiting preferred variations, where $A_d$ may be about 10, $A_r$ may be 0.5, $C_r$ may be about 5, and $C_d$ may be about 5.

Figures 13, 14:
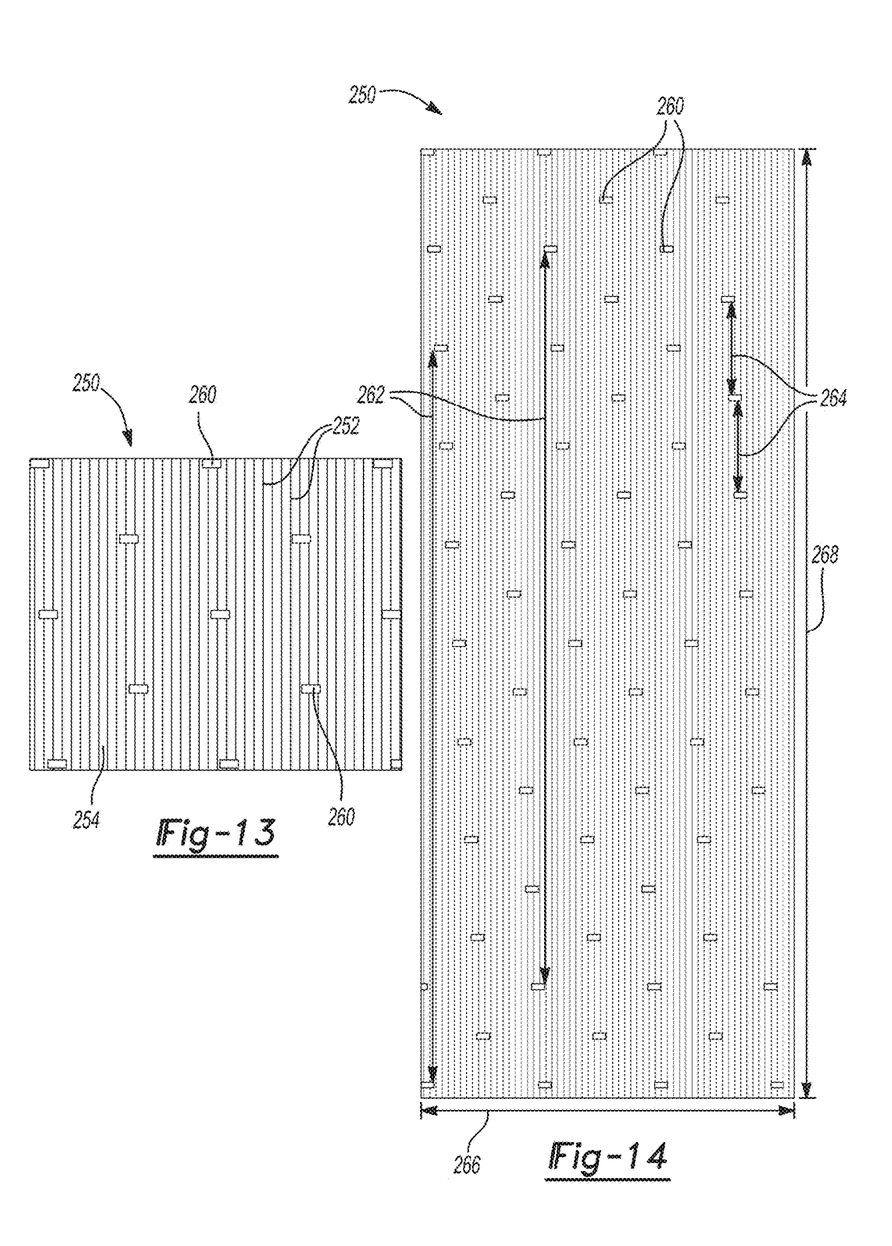
FIG. 13 shows a detailed view of a carbon fiber pre-impregnated composite precursor after being cut by the surface pattern shown in FIGS. 7 and 8.
FIG. 14 shows a broader view of the carbon fiber pre-impregnated composite precursor in FIG. 13.

FIGS. 13 and 14 show a carbon fiber pre-impregnated composite precursor material 250 having been cut by the first surface pattern 200 in FIGS. 7 and 8. The carbon fiber impregnated precursor material 250 can be a sheet comprising a plurality of continuous carbon fibers 252 imbibed with a polymer material precursor 254. The plurality of continuous carbon fibers 252 has a plurality of cut regions 260 that are discrete and discontinuous. As shown, the plurality of cut regions 260 is staggered across a width 266 of the precursor material 250 that will form a carbon-fiber reinforced composite. Thus, the locations of the cut regions 260 also differ in position with respect to one another along a length 268 of each continuous carbon fiber 252 (with respect to adjacent carbon fibers 252).

The plurality of continuous carbon fibers 252 thus have a plurality of staggered discontinuous or discrete cut regions 260 that define a first plurality of carbon fibers 262 having a first length and a second plurality of carbon fibers 264 having a second distinct length. The cut regions 260 may have dimensions corresponding to the cutters dimensions, for example, having a width of greater than or equal to about 0.2 mm to less than or equal to about 2 mm, optionally greater than or equal to about 0.1 mm to less than or equal to about 3 mm.

The carbon fiber lengths may be any of those discussed above, for example, the first plurality of carbon fibers 262 may have a first length of greater than or equal to about 5 mm to less than or equal to about 15 mm and the second plurality of carbon fibers 264 may have a second length of greater than or equal to about 20 mm to less than or equal to about 90 mm. In certain variations, the first length is greater than or equal to about 5 mm to less than or equal to about 10 mm and the second distinct length is greater than or equal to about 40 mm to less than or equal to about 85 mm. In one preferred aspect, the first length is about 10 mm and the second distinct length is about 85 mm.

Introduction of these staggered cut regions 260 in accordance with certain aspects of the present disclosure enables formation of carbon-fiber polymeric composites having high strength and low resistivity to resin flow, thus being more malleable and moldable. In this manner, the discontinuously cut fibers with different lengths can be shaped and follow the contours of the mold surface. When the carbon fiber pre-impregnated composite precursor material is subsequently compression molded, it has good flowability during compression molding, for example, a pre-preg stack of 4.5 inch by 4.5 inch covering 20.25 square inches of the mold surface is compression molded to fill the entire mold, which has a 25 square inch surface. This translates to some 19% flow based on surface expansion. In this manner, the carbon fiber pre-impregnated composite precursor material avoids separation of the resin and fibers and thus avoids or minimizes warpage, as discussed further below. Thus, composites formed from the carbon fiber pre-impregnated composite precursor materials of the present disclosure exhibit improved surface quality of unpainted panels, by avoiding fiber distortion around curvatures during the molding process. Additionally, composites formed from the inventive carbon fiber pre-impregnated composite precursor materials do not suffer loss of mechanical properties.

In certain aspects, the present disclosure provides a moldable carbon fiber composite pre-preg having a plurality of staggered discontinuous cut regions that provides at least 50% mold coverage that can flow and fill the mold cavity under less than 7 MPa compression molding to produce a 1.5 mm panel.

Figure 15:
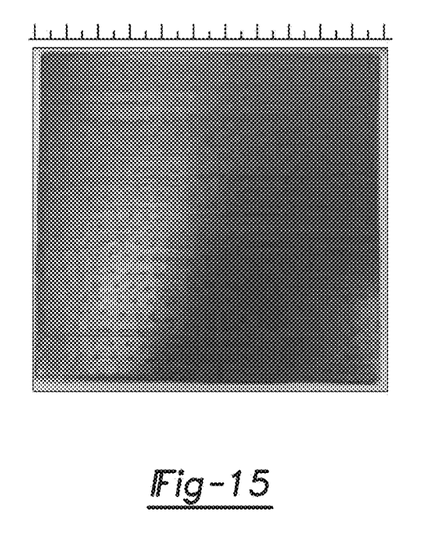
FIG. 15 shows flowability of a commercially available carbon fiber pre-impregnated composite precursor material.
Figure 16:
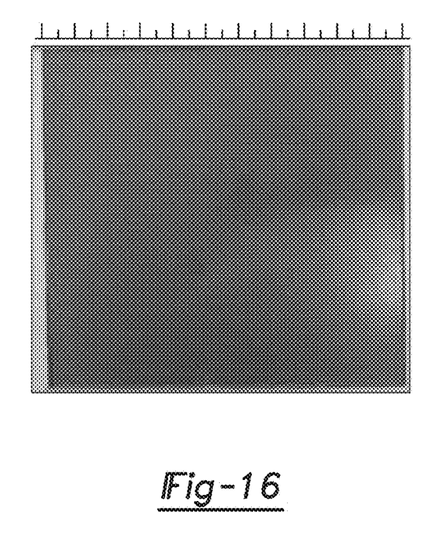
FIG. 16 shows flowability of a carbon fiber pre-impregnated composite precursor material processed in accordance with certain aspects of the present disclosure to have a plurality of staggered discontinuous cut regions defining a first length of carbon fibers and a second distinct length of carbon fibers showing improved moldability and flowability.

FIGS. 15 and 16 show comparative carbon fiber pre-impregnated composite precursor materials. FIG. 15 shows a comparative commercially available carbon fiber pre-impregnated composite precursor material having untreated continuous fibers sold by Cytec as VTM® 264 Prepreg with epoxy resin matrices. FIG. 16 shows the same commercially available VTM® 264 Prepreg carbon fiber pre-impregnated composite precursor material, but having been processed accordance with certain aspects of the present disclosure so that it has plurality of staggered discontinuous cut regions defining a first length of carbon fibers and a second distinct length of carbon fibers to improve moldability and flowability. As shown in FIG. 15, after compression molding at 130 t and 200 psi. The flowability of the commercially available untreated carbon fiber pre-preg was set at a standard 0%. In the example prepared in accordance with certain aspects of the present disclosure, FIG. 16 shows an increase in flowability of about 19%.

Figure 17:
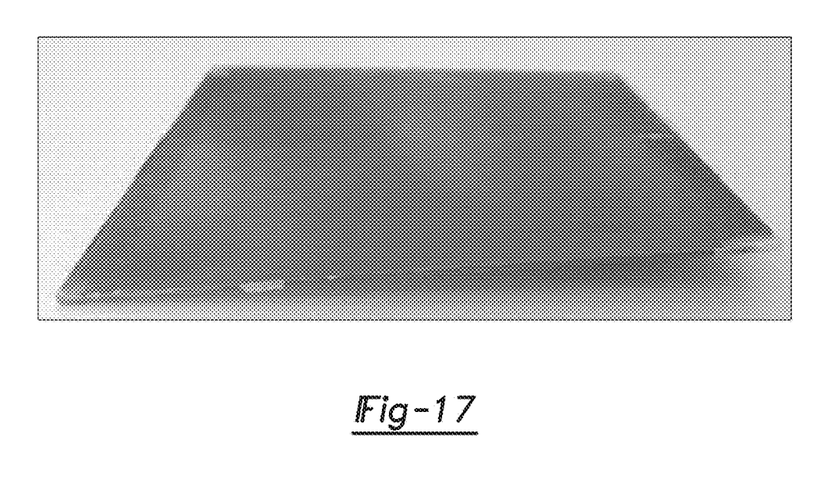
FIG. 17 shows a comparative molded composite material that has suffered from warpage at the edge due to inadequate flowability in the carbon fiber pre-impregnated composite precursor material.

During compression molding or other processing techniques used to form a composite component from a pre-preg, if separation of the resin and carbon fibers occurs, the composite part will fail. For example, if the resin and carbon fiber do not flow evenly during compression molding, expansion can be higher in the frame area than in the center area. Shrinkage thus occurs on the edges and causes three-dimensional deformation and warpage. For example, FIG. 17 shows a molded composite that has unsuitably suffered from warpage at the edge due to inadequate flowability of the carbon fiber pre-preg material.

In certain variations, the methods of the present disclosure further comprise heating the polymer material precursor so that it has a dynamic viscosity of greater than or equal to about 10,000 centipoise (cP) to less than or equal to about 100,000 cP and compression molding the carbon fiber pre-impregnated composite precursor material to cure the polymer material precursor and to form a carbon fiber composite component. The temperatures to which the carbon fiber pre-impregnated composite precursor material is heated depend upon the resin/precursor chemistry. For an epoxy based resin in the VTM® 264 Prepreg, the as-received room temperature viscosity of the VTM® 264 Prepreg is about 10,000,000 cP. Thus the VTM® 264 Prepreg can be heated to a temperature of greater than or equal to about 60° C. to less than or equal to about 80° C. to provide a viscosity below about 100,000 cP, optionally less than or equal to about 70,000 cP. As appreciated by those of skill in the art, the temperatures may vary depending on the resin chemistry in the carbon fiber pre-impregnated composite precursor materials; however, the target viscosities will be the same. The heating may occur prior to introduction into a compression mold or after the carbon fiber pre-impregnated composite precursor material is disposed in the mold (via a heated mold). Such viscosity levels ensure good flowability levels for the carbon fiber pre-impregnated composite precursor material as is it processed to form the composite.

In other aspects, a carbon fiber composite made from a moldable carbon fiber pre-impregnated composite precursor material having a plurality of staggered discontinuous cut regions still exhibits an ultrahigh strength, for example, greater than or equal to about 500 MPa. In certain variations, the ultimate tensile strength is greater than or equal to about 600 MPa, optionally greater than or equal to about 700 MPa, optionally greater than or equal to about 800 MPa, optionally greater than or equal to about 900 MPa, optionally greater than or equal to about 1,000 MPa, optionally greater than or equal to about 1,250 MPa, and in certain aspects, optionally greater than or equal to about 1,500 MPa.

The moldable carbon fiber composites are particularly suitable for use in components of an automobile or other vehicles (e.g., motorcycles, boats), but may also be used in a variety of other industries and applications, including aerospace components, industrial equipment and machinery, farm equipment, heavy machinery, by way of non-limiting example. For example, the carbon fiber composites having improved moldability according to the present disclosure may be used to form automotive structural components having contoured or complex three-dimensional shapes. Non-limiting examples include hoods, pillars, such as hinge pillars, panels, including structural panels, door panels, and door components, interior floors, floor pans, roofs, exterior surfaces, underbody shields, wheels, storage areas, including glove boxes, console boxes, trunks, trunk floors, truck beds, lamp pockets and other components, shock tower cap, control arms and other suspension, crush cans, bumpers, structural rails and frames, cross car beams, undercarriage or drive train components, and the like.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of producing a carbon fiber pre-impregnated composite precursor material having enhanced moldability, the method comprising:
    contacting a sheet of a carbon fiber pre-impregnated composite precursor material comprising a plurality of continuous carbon fibers and a polymer material precursor with a patterned surface having a plurality of non-contiguous staggered cutters defined therein, so that the contacting creates discontinuous cuts in the carbon fiber pre-impregnated composite precursor material, wherein the discontinuous cuts are a plurality of staggered discontinuous cut regions in the plurality of continuous carbon fibers of the carbon fiber pre-impregnated composite precursor material, so as to define a first plurality of carbon fibers having a first length and a second plurality of carbon fibers having a second distinct length, the first plurality of carbon fibers comprising greater than or equal to about 40% to less than or equal to about 60% of the first plurality of carbon fibers, and the second plurality of carbon fibers comprising greater than or equal to about 40% to less than or equal to about 60% of the first plurality of carbon fibers.

2. The method of claim 1, wherein the first length is greater than or equal to about 5 mm to less than or equal to about 15 mm and the second distinct length is greater than or equal to about 20 mm to less than or equal to about 90 mm.

3. The method of claim 1, wherein the first length is about 10 mm and the second distinct length is about 85 mm.

4. The method of claim 1, wherein the plurality of non-contiguous staggered cutters comprises a first cutter, a second cutter, a third cutter, and a fourth cutter, wherein the first cutter and the second cutter are aligned on a first row widthwise and the third cutter and the fourth cutter are aligned on a second row widthwise offset from the first row.

5. The method of claim 1, wherein the patterned surface is on a first roller and the contacting occurs by passing the sheet between the first roller and a second roller having a flat counter-surface.

6. The method of claim 1, wherein the patterned surface is on a first plate and the contacting occurs by placing the sheet between the first plate and a second plate having a flat counter-surface and applying pressure to the sheet.

7. The method of claim 1, further comprising heating the polymer material precursor so that it has a dynamic viscosity of greater than or equal to about 10,000 centipoise (cP) to less than or equal to about 100,000 cP and compression molding the carbon fiber pre-impregnated composite precursor material to cure the polymer material precursor and to form a carbon fiber composite component.

8. A carbon fiber pre-impregnated composite precursor material having enhanced moldability comprising:
    a sheet comprising a plurality of continuous carbon fibers and a polymer material precursor wherein the plurality of continuous carbon fibers has a plurality of staggered discontinuous cut regions that define a first plurality of carbon fibers having a first length and a second plurality of carbon fibers having a second distinct length, the first plurality of carbon fibers comprising greater than or equal to about 40% to less than or equal to about 60% of the first plurality of carbon fibers, and the second plurality of carbon fibers comprising greater than or equal to about 40% to less than or equal to about 60% of the first plurality of carbon fibers.

9. The carbon fiber pre-impregnated composite precursor material of claim 8, wherein the first length is greater than or equal to about 5 mm to less than or equal to about 15 mm and the second distinct length is greater than or equal to about 20 mm to less than or equal to about 90 mm.

10. The carbon fiber pre-impregnated composite precursor material of claim 8, wherein the first length is about 10 mm and the second distinct length is about 85 mm.

11. A carbon fiber composite made from the carbon fiber pre-impregnated composite precursor material of claim 8, wherein the carbon fiber composite has an ultimate tensile strength of greater than or equal to about 500 MPa.

12. An automotive structural component comprising the carbon fiber composite of claim 11, wherein the automotive structural component is selected from the group consisting of: a hood, a pillar, a structural panel, a door panel, a door component, an interior floor, a floor pan, a roof, an exterior surface, an underbody shield, a wheel component, a storage area, a glove box, a console box, a trunk, a trunk floor, a truck bed, a lamp pocket, a shock tower cap, a control arm, a suspension component, a crush can, a bumper, a structural rail, a structural frame, a cross car beam, an undercarriage component, a drive train component, and combinations thereof.

13. The carbon fiber pre-impregnated composite precursor material of claim 8, wherein the first length is greater than or equal to about 5 mm to less than or equal to about 10 mm and the second distinct length is greater than or equal to about 40 mm to less than or equal to about 85 mm.

14. The automotive structural component of claim 12, wherein the automotive structural component is the floor pan.

* * * * *